US009840070B2

(12) United States Patent
Jialanella et al.

(10) Patent No.: US 9,840,070 B2
(45) Date of Patent: Dec. 12, 2017

(54) CRASH-DURABLE ADHESIVE WITH ENHANCED STRESS DURABILITY

(71) Applicants: Gary L. Jialanella, Oxford, MI (US); Glenn G. Eagle, Bloomfield Hills, MI (US); Dakai Ren, Midland, MI (US); Andreas Lutz, Galgenen (CH)

(72) Inventors: Gary L. Jialanella, Oxford, MI (US); Glenn G. Eagle, Bloomfield Hills, MI (US); Dakai Ren, Midland, MI (US); Andreas Lutz, Galgenen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/368,910

(22) PCT Filed: Mar. 22, 2013

(86) PCT No.: PCT/US2013/033408
§ 371 (c)(1),
(2) Date: Jun. 26, 2014

(87) PCT Pub. No.: WO2013/142750
PCT Pub. Date: Sep. 26, 2013

(65) Prior Publication Data
US 2015/0001281 A1 Jan. 1, 2015

Related U.S. Application Data

(60) Provisional application No. 61/614,543, filed on Mar. 23, 2012.

(51) Int. Cl.

| | | |
|---|---|---|
| C09J 163/00 | (2006.01) | |
| C09J 163/10 | (2006.01) | |
| C08G 59/20 | (2006.01) | |
| C08G 59/24 | (2006.01) | |
| C08G 59/40 | (2006.01) | |
| B32B 37/12 | (2006.01) | |
| C08G 18/80 | (2006.01) | |
| C08G 18/10 | (2006.01) | |
| C08G 18/48 | (2006.01) | |
| B32B 37/06 | (2006.01) | |
| B62D 65/00 | (2006.01) | |
| C08G 59/42 | (2006.01) | |
| B32B 15/092 | (2006.01) | |

(52) U.S. Cl.
CPC .......... B32B 37/1284 (2013.01); B32B 37/06 (2013.01); B62D 65/00 (2013.01); C08G 18/10 (2013.01); C08G 18/48 (2013.01); C08G 18/8012 (2013.01); C08G 18/8067 (2013.01); C08G 59/4253 (2013.01); C09J 163/00 (2013.01); B32B 2037/1253 (2013.01); B32B 2307/558 (2013.01); B32B 2309/02 (2013.01); B32B 2311/24 (2013.01); B32B 2605/00 (2013.01)

(58) Field of Classification Search
None
See application file for complete search history.

(56) References Cited

U.S. PATENT DOCUMENTS

| 3,686,359 | A | | 8/1972 | Soldatos et al. | |
|---|---|---|---|---|---|
| 3,947,522 | A | * | 3/1976 | Shelley, Jr. | ............. C08L 63/00 525/107 |
| 3,972,111 | A | * | 8/1976 | Dash | ..................... B23K 11/163 156/285 |
| 4,659,779 | A | * | 4/1987 | Bagga | ..................... C08G 59/18 525/109 |
| 4,701,378 | A | | 10/1987 | Bagga et al. | |
| 4,734,332 | A | | 3/1988 | Bagga et al. | |
| 5,112,932 | A | | 5/1992 | Koenig et al. | |
| 5,202,390 | A | | 4/1993 | Mulhaupt et al. | |
| 5,278,257 | A | | 1/1994 | Mulhaupt et al. | |
| 8,071,217 | B2 | | 12/2011 | Kramer et al. | |
| 8,114,519 | B2 | | 2/2012 | Kramer et al. | |
| 8,202,920 | B2 | | 6/2012 | Kramer et al. | |
| 9,000,120 | B2 | * | 4/2015 | Ming | ..................... C09J 163/00 525/486 |
| 2005/0070634 | A1 | | 3/2005 | Lutz et al. | |
| 2005/0209401 | A1 | | 9/2005 | Lutz et al. | |
| 2006/0276601 | A1 | | 12/2006 | Lutz et al. | |
| 2008/0251202 | A1 | | 10/2008 | Eagle et al. | |
| 2009/0264558 | A1 | | 10/2009 | Kramer et al. | |
| 2010/0087588 | A1 | * | 4/2010 | Kramer | ................... C08C 19/36 524/539 |
| 2011/0024039 | A1 | * | 2/2011 | Campbell | .......... C08G 59/5086 156/330 |
| 2012/0103517 | A1 | | 5/2012 | Eagle et al. | |

FOREIGN PATENT DOCUMENTS

| WO | 2005118734 A1 | 12/2005 |
|---|---|---|
| WO | 2012000171 A1 | 1/2012 |
| WO | 2012006001 A2 | 1/2012 |

* cited by examiner

*Primary Examiner* — Michael J Feely

(57) ABSTRACT

A heat-curable structural adhesive includes a non-rubber-modified epoxy resin, a reaction product of a carboxyl-or amine-terminated butadiene polymer or copolymer and a bisphenol F-based epoxy resin, a elastomeric toughener containing capped isocyanate groups, one or more epoxy curing agents a moisture scavenger and a heat activatable catalyst comprising a mixture of a solid or liquid tertiary amine compound that has a boiling temperature of at least 130° C. and a novolac resin. The structural adhesive develops excellent bonding properties when cured at moderate temperatures, especially from 120 to 170° C., and in addition performs very well in environmental aging stress testing. The adhesive is particularly good for bonding aluminum to another metal, or bonding aluminum to aluminum.

6 Claims, No Drawings

CRASH-DURABLE ADHESIVE WITH ENHANCED STRESS DURABILITY

This invention relates to an epoxy-based structural adhesive and a process for bonding metal members, especially aluminum.

Epoxy-based adhesives are used in manufacturing settings to bond metals to other metals or to other materials. In the automotive industry, these adhesives are used to bond frame members to each other or to other parts of the vehicle. Before suitable adhesives were developed, the primary approach to assembling these frame members to each other or other parts was by welding, or in some cases through other mechanical means. The structural adhesive partially or completely replaces the welding and mechanical attachments.

A class of structural adhesives has been developed for these applications. They are commonly known as "crash-durable adhesives" or "CDAs", because they are formulated to resist failure during high-force conditions as are experienced during collisions. A prominent class of CDAs is based on one or more epoxy resin(s) that are modified with a rubber and an elastomeric "toughener". Structural adhesives of this type are described, for example, in U.S. Pat. Nos. 5,202,390, 5,278,257, U.S. Published Patent Application No. 2005/0070634, U.S. Published Patent Application No. 2005/0209401, U.S. Published Patent Application 2006/0276601, U.S. Published Patent Application No. 2008/0251202, EP-A-0 308 664, EP-A 1 728 825, EP-A 1 896 517, EP-A 1 916 269, EP-A 1 916 270, EP-A 1 916 272, EP-A-1 916 285, WO 2005/118734 and WO 2012/000171.

Most CDAs are formulated to require an elevated temperature cure. It is common to integrate this curing step with other steps of the manufacturing process that also require high temperatures. Doing so represents a significant saving in manufacturing costs. For example, vehicle frame assemblies are usually coated with a protective coating, which requires a bake cure. An increasingly common practice is to cure the CDA at the same time as the protective coating. In such a process, the CDA is applied to the frame elements, which are then assembled together. Some or all of the frame elements typically are welded together (although they can be temporarily held together using other mechanical means), and the assembly is then coated with the protective coating and baked to cure the coating. The CDA cures during the heat step.

The CDAs must meet several requirements simultaneously. When cured, the adhesive also must be able to withstand strong mechanical shocks such as might be experienced in a collision. This property can be measured using an impact peel strength test such as the ISO 11343 wedge impact method. Another requirement is that the adhesive bond must be able to withstand mechanical stress even during or after exposure to corrosive materials such as salt solutions. This property is important because vehicular frame assemblies routinely are exposed to salt solutions, particularly during winter months when salts are often applied to roadways to melt snow and ice. A useful test method for evaluating stress resistance under corrosive conditions is a stress durability test such as described by Dickie, DeBolt, and Ward in "Stress Durability Testing of Adhesively Bonded Steel," SAE Technical Paper 950128, 1995. The cured adhesive must retain these properties over a wide range of temperatures.

In addition, the CDA preferably achieves the needed properties when bonded to a number of substrates, including cold rolled steel, galvanel and, notably, aluminum. Bonding to aluminum often represents a particular challenge, especially in relation to stress durability and impact peel strength. Many CDAs cannot meet the stress durability requirements when used to bond aluminum.

Some CDAs can meet the impact peel strength requirements if cured at temperatures exceeding 170° C. However, impact peel strength has been found to depend strongly on the cure temperature, and even a small drop in cure temperature, such as to 160° C. or so, often leads to inadequate impact peel performance. Unfortunately, inadequate curing temperatures are seen quite often in industrial baking furnaces, especially large ovens that can accommodate large structures such as automotive frame assemblies. This is due to several factors. For energy and cost considerations, manufacturers prefer to operate at the lowest possible temperatures. When the adhesive is cured simultaneously with a coating bake step, the temperature often is selected to meet the coating baking requirements rather than those of the adhesive. In addition, heat distribution can be far from uniform in large ovens, which leads to large differences in temperature in various parts of the oven. Massive parts also function as heat sinks that often remain cooler than the nominal oven temperature, such that an adhesive layer adjoining those parts does not reach the full oven temperature. For these reasons, the adhesive may not achieve the curing temperature needed to fully develop its impact peel strength. Therefore, it would be desirable to provide a CDA that develops adequate impact peel strength even when cured at temperatures of 150-170° C., which adhesive also exhibits other needed properties such as good lap shear strength and good stress durability.

This invention is in one aspect a heat-curable structural adhesive comprising

A) at least one non-rubber-modified epoxy resin;
B) a reaction product of a carboxyl- or amine-terminated butadiene polymer or copolymer and a bisphenol F-based epoxy resin;
C) at least one elastomeric toughener containing capped isocyanate groups;
D) one or more epoxy curing agents;
E) from 0.5 to 10 weight percent of a moisture scavenger, based on the total weight of the heat-curable structural adhesive; and
F) a heat activatable catalyst comprising a mixture of a solid or liquid tertiary amine compound that has a boiling temperature of at least 130° C. and a novolac resin, and further wherein the elastomeric toughener and the rubber portion of the rubber-modified epoxy resin together constitute from 15 to 25% of the total weight of the heat-curable adhesive.

The invention exhibits excellent impact shear strength, 50° C. storage modulus, except environmental aging under stress, even when cured at somewhat lower temperatures, such as 120 to 170° C. and especially 150 to 170° C. The invention also exhibits excellent wet modulus and exhibits a surprisingly high creep apparent activation energy. The ability to develop these properties and moderate cure temperatures is an important advantage in automotive production settings, in which the cure is performed together with the back cure of an automotive coating.

In some embodiments the structural adhesive when cured a) exhibits an impact shear strength of at least 20 N/mm as measured according to the ISO 11343 wedge impact method on 2 mm-thick aluminum 6111 alloy substrates after curing at 160° C. for 10 minutes, b) exhibits a storage modulus of at least 900 MPa at 50° C. as measured by dynamic mechanical analysis according to ASTM E2254-09; and/or c) withstands at least 45 cycles of the environmental aging under stress test described below after curing for 10 minutes at 160° C.

The invention also is a method for bonding an aluminum member to a second metal member, comprising forming a layer of a heat-curable structural adhesive between and in contact with the aluminum member and the second metal member and then heating the structural adhesive at a temperature of at least 120° C. up to 170° C. to cure the structural adhesive and form an adhesive bond between the aluminum member and the second metal member, wherein the heat-curable structural adhesive comprises A) at least one non-rubber-modified epoxy resin;
B) a reaction product of a carboxyl- or amine-terminated butadiene polymer or copolymer and a bisphenol F-based epoxy resin;
C) at least one elastomeric toughener containing capped isocyanate groups;
D) one or more epoxy curing agents;
E) from 0.5 to 10 weight percent of a moisture scavenger, based on the total weight of the heat-curable structural adhesive; and
F) a heat activatable catalyst including a mixture of a solid or liquid tertiary amine compound that has a boiling temperature of at least 130° C., and a novolac resin, and further wherein the elastomeric toughener and the rubber portion of the rubber-modified epoxy resin together constitute from 15 to 25% of the total weight of the heat-curable adhesive.

The heat-curable structural adhesive contains at least one non-rubber-modified epoxy resin, by which it is meant an epoxy resin that is not (prior to curing) chemically bonded to a rubber. The non-rubber-modified epoxy resin preferably will constitute at least about 25 weight percent of the heat-curable structural adhesive, more preferably at least about 30 weight percent. The non-rubber-modified epoxy resin may constitute up to about 55 weight percent of the heat-curable structural adhesive, more preferably up to about 50 weight percent and still more preferably up to 45 weight percent. These amounts include any free epoxy resin contained in a rubber-modified epoxy resin composition as described below, as well as any free epoxy resin in which core-shell rubber particles are dispersed, also as described below.

The non-rubber modified epoxy resin or resins preferably has an average epoxy equivalent weight of 170 to 600, more preferably from 170 to 500 and still more preferably from 170 to 400.

A wide range of epoxy resins can be used as the non-rubber-modified epoxy resin, including those described at column 2 line 66 to column 4 line 24 of U.S. Pat. No. 4,734,332, incorporated herein by reference. The non-rubber-modified epoxy resin or resins should have an average of at least 2.0 epoxide groups per molecule.

A preferred type of non-rubber modified epoxy resin is a diglycidyl ether of a polyhydric phenol compound such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol. Resins such as these can have average epoxy equivalent weights of from about 170 to 2000, preferably from 225 to 400. Examples of epoxy resins of this type include diglycidyl ethers of bisphenol A such as are sold by Dow Chemical under the designations D.E.R.® 330, D.E.R.® 331, D.E.R.® 332, D.E.R.® 383, D.E.R. 661, D.E.R.® 662 and D.E.R.® 667 resins. An especially preferred non-rubber-modified epoxy resin is a mixture of at least one diglycidyl ether of a polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 2000. Such an especially preferred non-rubber modified epoxy resin mixture may include up to 20%, more preferably up to 10% by weight of another type of epoxy resin as described below.

Other useful non-rubber-modified epoxy resins (any of which can be used by themselves or in admixture with one or more others) include, for example, diglycidyl ethers of aliphatic glycols and polyether glycols, such as the diglycidyl ethers of $C_{2-24}$ alkylene glycols and poly(ethylene oxide) or poly(propylene oxide) glycols (including those sold as D.E.R.® 732 and D.E.R.® 736 by Dow Chemical); polyglycidyl ethers of phenol-formaldehyde novolac resins (epoxy novolac resins), including those sold as D.E.N.® 354, D.E.N.® 431, D.E.N.® 438 and D.E.N.® 439 by Dow Chemical; alkyl substituted phenol-formaldehyde resins; phenol-hydroxybenzaldehyde resins; cresol-hydroxybenzaldehyde resins; dicyclopentadiene-phenol resins; cycloaliphatic epoxides including (3,4-epoxycyclohexyl-methyl)-3,4-epoxy-cyclohexane carboxylate, bis-(3,4-epoxycyclohexyl) adipate, vinylcyclohexene monoxide as well as others as described in U.S. Pat. No. 3,686,359; oxazolidone-containing compounds as described in U.S. Pat. No. 5,112,932; dicyclopentadiene-substituted phenol resins; and advanced epoxy-isocyanate copolymers such as those sold commercially as D.E.R. 592 and D.E.R. 6508 (Dow Chemical).

The heat-curable structural adhesive includes at least one rubber-modified bisphenol F-based epoxy resin. The rubber-modified bisphenol-based epoxy resin is a reaction product of a liquid carboxyl- or amine-terminated butadiene polymer or copolymer (the liquid rubber) with a bisphenol F-based epoxy resin. The bisphenol F-based epoxy resin is a diglycidyl ether of bisphenol F, which may be partially advanced. The bisphenol F-based epoxy resin may have an epoxy equivalent weight from 157 to 2000, preferably from 170 to 350 and more preferably from 170 to 220. The resulting material has reactive epoxide groups that allow it to react further when the heat-curable structural adhesive is cured. It is preferred that at least a portion of the liquid rubber has a glass transition temperature ($T_g$) of −30° C. or lower, especially −40° C. or lower. The rubber $T_g$ may be as low as −100° C. or even lower.

The liquid rubber is a homopolymer or copolymer of butadiene, especially a copolymer of butadiene and a nitrile monomer. The preferred nitrile monomer is acrylonitrile. The rubber preferably contains from about 1.5, more preferably from about 1.8, to about 2.5, more preferably to about 2.2, terminal epoxide-reactive amino or carboxyl groups per molecule, on average. Carboxyl-terminated butadiene polymers and copolymers are preferred. The molecular weight ($M_n$) of the butadiene polymer or copolymer is suitably from about 2000 to about 6000, more preferably from about 3000 to about 5000.

Suitable carboxyl-functional butadiene and butadiene/acrylonitrile copolymers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/ acrylonitrile copolymer is sold under the tradename Hycar® 1300X21.

The rubber-modified epoxy resin is formed by reaction of the butadiene polymer or copolymer with an excess of the bisphenol F-based epoxy resin. Enough of the epoxy resin is provided to react with substantially all of the epoxy-reactive amino or carboxyl groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, more than two equivalents of epoxy resin per equivalent are provide of epoxy-reactive groups on the rubber, as this forms a mixture of the rubber-modified epoxy resin and some free (unreacted) epoxy resin, and also helps to minimize advancement. The presence of free epoxy resin tends to decrease the viscosity of the product. Any such free epoxy resin in the mixture counts as part of the non-rubber-modified epoxy resin content of the adhesive.

A preferred rubber-modified epoxy resin is a reaction product of an amine- or carboxyl-terminated butadiene homopolymer or copolymer with a diglycidyl ether of bisphenol F, which after reaction may be diluted with another epoxy resin, such as a diglycidyl ether of a bisphenol such as bisphenol A or bisphenol F and having an epoxy equivalent weight of about 170 to 2000. Diluting the rubber-modified epoxy resin can reduce its viscosity to a useful level. The epoxy resin used to dilute the rubber-modified epoxy resin, together with any unreacted diglycidyl ether of bisphenol, will form part of the non-rubber-modified epoxy resin.

The elastomeric toughener is a liquid or low-melting elastomeric material that contains urethane and/or urea groups and has terminal blocked isocyanate groups. Blocked isocyanate groups have been reacted with a compound that has one or more functional groups that can reversibly react with an isocyanate group to form the Mocking group.

The elastomeric toughener preferably contains up to 6, more preferably up to four, such Mocked isocyanate groups. Tougheners of this type are described, for example, in U.S. Pat. Nos. 5,202,390, 5,278,257, U.S. Published Patent Application No. 2005/0070634, U.S. Published Patent Application No. 2005/0209401, U.S. Published Patent Application 2006/0276601, U.S. Published Patent Application No. 2008/0251202, EP-A-0 308 664, EP-A 1 728 825, EP-A 1 896 517, EP-A 1 916 269, EP-A 1 916 270, EP-A 1 916 272, EP-A-1 916 285, WO 2005/118734 and WO 2012/000171.

Preferably, the weight average molecular weight of the elastomeric toughener is about 8,000 or greater, and more preferably about 10,000 or greater. Preferably, the molecular weight of the toughener is about 70,000 or less, and more preferably about 40,000 or less. Molecular weights as used herein are determined by gel permeation chromatography (GPC). The elastomeric toughener preferably has a viscosity at 45° C. not greater than 1000 Pa·s and more preferably no more than about 800 Pa·s.

The toughener is preferably linear, branched or at most lightly crosslinked, preferably having a crosslink density of about 2 or less and preferably about 1 or less. Crosslink density is the number of attachments between chains of polymers.

The elastomeric toughener advantageously includes at least one polyether, polybutadiene or polyester segment that has a molecular weight of 300 to 3000. The polyether, polybutadiene or polyester segment(s) may form part of a polyurethane and/or polyurea backbone.

The toughener is prepared by forming an isocyanate-terminated prepolymer by reaction of an excess of a polyisocyanate with one or more isocyanate-reactive materials, and then Mocking the terminal isocyanate groups through reaction with the Mocking agent. The isocyanate-reactive materials preferably include at least one polyether, polybutadiene or polyester segment that has a molecular weight of 300 to 3000 and has isocyanate-reactive groups. The isocyanate-reactive materials also may include one or more low molecular weight crosslinking and/or chain extending compounds.

The polyisocyanate preferably is an aliphatic polyisocyanate such as isophorone diisocyanate, 1,6-hexamethylene diisocyanate, hydrogenated toluene diisocyanate, hydrogenated methylene diphenylisocyanate ($H_{12}MDI$), and the like.

Suitable Mocking agents include those that form non-reactive Mocking groups, and those that form reactive blocking groups.

The blocking agents that form non-reactive Mocking groups have a single isocyanate-reactive group, and no other groups that are reactive toward epoxy groups. Examples of this type of Mocking agents include monophenolic compounds, monoamine compounds such as primary or secondary aliphatic, cycloaliphatic or aromatic monoamines, monothiol compounds, benzyl amines, and the like. Among these, monophenols such as phenol, alkyl phenols which contain one or more alkyl groups that each may contain from 1 to 30 carbon atoms, naphthol, or a halogenated phenol or naphthol, are preferred.

Blocking agents that form reactive Mocking groups have at least one isocyanate-reactive group, and in addition at least one other group which is reactie toward epoxy resins (and which may be reactive toward isocyanate groups as well). Among the blocking agents of this type are polylphenolic compounds and aminophenolic compounds. Examples of suitable polyphenols include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. Aminophenol Mocking agents contain at least one primary or secondary amino group and at least one phenolic hydroxyl group. The amino group is preferably bound to a carbon atom of an aromatic ring. Examples of suitable aminophenols include 2-aminophenol, 4-aminophenol, various aminonaphthols, and the like.

The toughener plus the weight of the rubber included in the rubber-modified epoxy resin and core-shell rubber constitutes 15 to 25%, more preferably 16 to 25%, and still more preferably 16 to 22%, of the total weight of the heat-curable structural adhesive. The rubber included in the rubber-modified epoxy resin in some embodiments constitutes 2 to 10 percent, preferably 4 to 8 percent of the total weight of the structural adhesive. The toughener preferably constitutes at least 5 weight percent of the adhesive composition, more preferably at least 8 weight percent and still more preferably at least 10 weight percent thereof, up to 20 weight percent and more preferably up to 16 weight percent.

The structural adhesive also contains a curing agent. The curing agent is selected together with any catalyst(s) such that the adhesive cures rapidly when heated to a temperature of 80° C. or greater, preferably 120° C. or greater, and still more preferably 140° C. but cures very slowly if at all at room temperature (~22° C.) and temperatures up to at least 50° C. Suitable curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred.

The curing agent is used in an amount sufficient to cure the composition. Typically, enough of the curing agent is provided to consume at least 80% of the epoxide groups present in the composition. A large excess over that amount needed to consume all of the epoxide groups is generally not needed. Preferably, the curing agent constitutes at least about 1.5 weight percent of the structural adhesive, more preferably at least about 2.5 weight percent and even more preferably at least 3.0 weight percent. The curing agent preferably constitutes up to about 15 weight percent of the structural adhesive composition, more preferably up to about 10 weight percent, and most preferably up to about 8 weight percent.

The structural adhesive contains 0.5 to 10 percent, preferably 2 to 5 weight percent of a moisture scavenger. The presence of the moisture scavenger has been found to greatly extend the open time of the structural adhesive at temperatures below 80° C. The moisture scavenger binds (chemically or physio-chemically) free water present in the heat-curable structural adhesive and more preferably will not release the bound water until heated to a temperature of at least 160° C., preferably at least 200° C. Examples of suitable moisture scavengers include calcium oxide, magnesium oxide, phosphorus pentoxide, various molecular sieves and the like. Calcium oxide is preferred. Calcium oxide is conveniently provided in the form of fine particles (preferably less than 100 micrometers in diameter).

The heat activatable catalyst includes a mixture of a solid or liquid tertiary amine compound that has a boiling temperature of at least 130° C., and a novolac resin. Examples of heat-activatable catalysts of this type include those described, for example, in U.S. Pat. No. 4,701,378 and WO 2012/000171. Among the useful tertiary amine compounds are p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), benzyldimethylamine, aminophenols such as 2,4,6-tris(dimethylaminomethyl)phenol, piperidine, various aliphatic urea compounds such as are described in EP 1 916 272; $C_1$-$C_{12}$ alkylene imidazole or N-arylimidazoles such as 2-ethyl-2-methylimidazol and N-butylimidazol, and 6-caprolactam. A preferred catalyst is an aminophenol compound such as 2,4,6-tris(dimethylaminomethyl)phenol. The novolac resin may have a molecular weight from 500 to 10,000, preferably from 500 to 30,000 or more. The molecular weight is limited only by the need for the novolac resin to soften or melt at a reasonable temperature, so it can be mixed with the tertiary amine compound to produce the heat-activatable catalyst. Preferably, the novolac resin softens at a temperature of from about 90 to about 200° C., especially from about 130 to 200° C. An especially preferred novolac resin is a phenol-formaldehyde resin having a weight average molecular weight of from 10,000 to 25,000.

Preferably, the heat-activatable catalyst is present in an amount of at least about 0.1 weight percent of the structural adhesive, and more preferably at least about 0.5 weight percent. In some embodiments, the heat-activatable catalyst constitutes at least 1 weight percent of the structural adhesive. Preferably, the catalyst constitutes up to about 4 weight percent of the structural adhesive, more preferably up to about 1.5 weight percent, and most preferably up to about 0.9 weight percent.

The heat-activatable catalyst may be used in combination with one or more other catalysts, which preferably also are heat activatable. The other catalysts may include various amine compounds as described above, which are blocked with a Mocking group other than a novolac resin. An example of such other catalyst is a Mocked 1-(2-(2-hydroxylbenzamido)ethyl)-2-(2-hydroxylphenyl-2-imidazoline). Another such other catalyst is an aminophenol such as 2,4-6-tris(dimethylaminomethyl)phenol in a poly(vinylphenol) matrix. Such other catalyst, when used, preferably is present in an amount smaller than that of the amine/novolac resin mixture, and more preferably in an amount from 0.1 to 0.3 times by weight that of the amine/novolac resin mixture.

The structural adhesive of the invention may contain various other optional components.

The structural adhesive may contain one or more flame retardants. A particularly suitable flame retardant is a mixture of alumina trihydrate, zinc borate and melamine or a melamine derivative such as melamine polyphosphate. These components together may constitute at least 10 percent to as much as 25 weight percent of the weight of the structural adhesive, preferably 14 to 18 weight percent.

At least one filler, rheology modifier and/or pigment preferably is present in the structural adhesive. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of these materials include calcium carbonate, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. The particle size is preferably about 25 to 150 microns and the density is preferably from about 0.05 to about 0.15 g/cc. Heat expandable microballoons, which are suitable for reducing density, include those commercially available from Dualite Corporation under the trade designation Dualite™, and those sold by Akzo Nobel under the trade designation Expancel™.

Fillers, pigment and rheology modifiers are preferably are used in an aggregate amount of about 2 parts per hundred parts of adhesive composition or greater, more preferably about 5 parts per hundred parts of adhesive composition or greater. They preferably are present in an amount of up to about 25 weight percent of the structural adhesive, more preferably up to about 20 weight percent, and most preferably up to about 15 weight percent.

The speed and selectivity of the cure can be enhanced and adjusted by incorporating a monomeric or oligomeric, addition polymerizable, ethylenically unsaturated material into the structural adhesive. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the structural adhesive as well, in order to provide a source of free radicals to polymerize this material. The inclusion of an ethylenically unsaturated material of this type provides the possibility of effecting a partial cure of the structural adhesive through selective polymerization of the ethylenic unsaturation.

The structural adhesive can further contain other additives such as dimerized fatty acids, core-shell rubbers, diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

The adhesive composition can be applied by any convenient technique. It can be applied cold or be applied warm if desired. It can be applied by extruding it from a robot into bead form on the substrate, it can be applied using mechanical application methods such as a caulking gun or any other manual application means, and it can also be applied using jet spraying methods such as a streaming method or a swirl technique. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably about 140° C. or above. Preferably, the temperature is about 220° C. or less, and more preferably about 180° C. or less and especially from 150 to 170° C. An advantage of this invention is that it develops good properties, notably good impact peel strength and stress durability, when cured at temperatures at or below 170° C., such as from 140 to 170° C. and especially from 150 to 170° C.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

The structural adhesive of the invention is especially suitable for use in a method in which an aluminum member and a second metal member (which may or may not be aluminum) are bonded. By "aluminum", it is mean pure aluminum metal or any alloy containing at least 80% by weight aluminum. In such a method, the structural adhesive of the invention is formed into a layer between and in contact with the members, and heated at a temperature of at least 120° C. to cure the adhesive and form a structural bond between the members. The curing temperature preferably is 120 to 170° C. and even more preferably 150° C. to 170° C. Preferably, the second metal member is also aluminum. The aluminum member and the second metal member may form all or part of a vehicular frame assembly. The aluminum member and the second metal member (including, but not limited to the case in which they form all or part of a vehicular frame assembly) may be coated with a coating that requires a bake cure, and the structural adhesive may be cured simultaneously with the bake cure of the coating. In any of these embodiments of the method of the invention, the aluminum member and the second member may be welded before the structural adhesive is cured.

In certain embodiments, the cured structural adhesive of the invention:

a) exhibits an impact shear strength of at least 20 N/mm as measured according to the ISO 11343 wedge impact method on 2 mm-thick aluminum 6111 alloy substrates after curing at 160° C. for 10 minutes, b) exhibits a storage modulus of at least 900 MPa at 50° C. as measured by dynamic mechanical analysis according to ASTM E2254-09; and/or c) withstands at least 45 cycles of the environmental aging under stress test after curing for 10 minutes at 160° C.

The cured adhesive preferably meets all three of these characteristics.

The environmental aging under stress test is that described in Dickie, DeBolt, and Ward in "Stress Durability Testing of Adhesively Bonded Steel," SAE Technical Paper 950128, 1995. Test speciments are formed by applying a 0.15 mm thick layer of the structural adhesive between two clean 2 mm-thick alloy 6111 aluminum coupons to form a bond overlap of ½ inch (12.7 mm) and a bond-width of 1 inch (25.4 mm), and cured for 30 minutes at 180° C. A 2400 N load is applied to the cured assembly, which is then subjected to repeating cycles of 15 minutes immersion in a 5 wt-% NaCl solution in water at approximately 25° C., 105 minutes drying in air at 25° C. and ambient humidity and 22 hours at 50° C. and 90% relative humidity. After five such cycles, the assembly is held for two additional days at 50° C. and 90% relative humidity, so that five cycles are performed each calendar week. The cycling is continued on the foregoing schedule until the adhesive bond fails.

The cured adhesive also preferably exhibits a water uptake of no more than 2.2% by weight, measured by curing 3-mm thick plaques of the adhesive, punching 8-mm diameter disks from the plaque, weighing each disk, soaking the disks separately in dionized water at room temperature, removing the disks and removing free water from the disks and again weighing each disk. The disks are re-soaked and re-weighed until they reach constant weight. The weight gained to equilibrium divided by the initial weight of the sample is the water uptake. The average of five samples is reported.

The following examples are provided to illustrate the invention but are not intended to limit the scope thereof. All parts and percentages are by weight unless otherwise indicated.

EXAMPLES 1-2 AND COMPARATIVE SAMPLES A-D

One-component heat-curable structural adhesive Examples 1-2 and Comparative Samples A-D are prepared by mixing the components listed in Table 1.

TABLE 1

|  | Comp. A | Comp. B | Comp. C | Comp. D | Ex. 1 | Ex. 2 |
|---|---|---|---|---|---|---|
| Non-Rubber Modified Epoxy Resin A[1] | 43.97 | 45.71 | 48.41 | 32.66 | 41.0 | 34.56 |
| Rubber-Modified Bisphenol A-based Epoxy Resin A[2] | 0 | 11.54 | 7.48 | 0 | 0 | 0 |
| Rubber-Modified Bisphenol A-based Epoxy Resin B[3] | 0 | 0 | 7.48 | 0 | 0 | 0 |
| Rubber-Modified Bisphenol F-based Epoxy Resin[4] | 23.80 | 0 | 0 | 31.70 | 23.80 | 26.50 |
| Reactive Diluent | 0 | 1.14 | 3.15 | 0 | 0 | 0 |
| Toughener A[5] | 9.00 | 0 | 0 | 12.00 | 0 | 0 |
| Toughener B[6] | 0 | 17.31 | 9.67 | 0 | 12 | 12 |
| Surfactant | 0.38 | 0.68 | 1.28 | 0.28 | 0.3 | 0.28 |
| Color Pigment | 0.3 | 0.2 | 0.6 | 0.3 | 0.3 | 0.16 |
| Dicyanamide | 5.38 | 5.08 | 5.61 | 5.38 | 5.1 | 4.0 |
| Inorganic Fillers | 16.72 | 9.98 | 11.84 | 16.72 | 12.7 | 4.0 |
| Calcium Oxide | 0 | 4.9 | 3.65 | 0 | 4.0 | 3.0 |
| Flame Retardant package | 0 | 0 | 0 | 0 | 0 | 14.8 |
| Polyvinyl butryal | 0 | 2.7 | 0 | 0 | 0 | 0 |
| 2,4,6-tris(dimethylaminomethyl) phenol in poly (vinylphenol) matrix | 0 | 0.78 | 0.82 | 0 | 0 | 0 |
| Blocked diethylene triamine catalyst | 0.50 | 0 | 0 | 0.51 | 0.2 | 0.1 |
| 2,4,5-tris(dimethylaminomethyl) phenol in novolac resin matrix | 0 | 0 | 0 | 0 | 0.6 | 0.7 |
| % Rubber | 4.66 | 4.62 | 5.98 | 6.21 | 4.66 | 5.20 |
| % Rubber + Toughener | 13.8 | 21.91 | 15.7 | 18.2 | 16.8 | 17.2 |

[1] Non-Rubber-Modified Epoxy Resin A is a diglycidyl ether of bisphenol A sold by The Dow Chemical Company as D.E.R.™ 331. It has an epoxy equivalent weight of about 186.
[2] Rubber-Modified Bisphenol A-Based Epoxy Resin A is a reaction product of 60% by weight of a mixture of a ~180 epoxy equivalent weight diglycidyl ether of bisphenol A with 40% by weight of a carboxyl-terminated butadiene/acrylonitrile rubber sold by Noveon as Hycar® 1300X8.
[3] Rubber-Modified Bisphenol A-Based Epoxy Resin B is a reaction product of 60% by weight of a mixture of a ~180 epoxy equivalent weight diglycidyl ether of bisphenol A with 40% by weight of a carboxyl-terminated butadiene/acrylonitrile rubber sold by Noveon as Hycar® 1300X13.
[4] Rubber-Modified Bisphenol F-Based Epoxy Resin A is a reaction product of 70.2% by weight of a mixture of a ~180 epoxy equivalent weight diglycidyl ether of bisphenol F with 19.6% by weight of a carboxyl-terminated butadiene/acrylonitrile rubber sold by Noveon as Hycar® 1300X13, which is further diluted with 10.2% of a solid diglycidyl ether of bisphenol A having an epoxy equivalent weight of 1600-2000 sold by The Dow Chemical Company as D.E.R.® 667.
[5] Toughener A is an isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664.
[6] Toughener B is the same as Toughener A, except the capping groups are phenol rather than o,o-diallylbisphenol A.

Duplicate test coupons are prepared and are evaluated for lap shear strength in accordance with DIN EN 1465, using 2 mm-thick 6111 aluminum alloy coated with DC290 lubricant. Testing is performed at a test speed of 10 mm/minute and at 23° C. Test samples are prepared using each adhesive. The bonded area in each case is 25×10 mm. The adhesive layer is 0.2 mm thick. Duplicate test specimens are cured for 30 minutes at 180° C. Results are as indicated in Table 2.

Impact peel testing is performed in accordance with the ISO 11343 wedge impact method. Testing is performed using an Instron Dynatup 8250 device operated at 2 mm/sec. Test coupons are 100 mm×20 mm with a bonded area of 20×30 mm. The substrate is 0.8 mm-thick cold rolled steel that has been cleaned with acetone before applying the adhesive. A 0.15 mm×10 mm wide Teflon tape is applied to the coupons to define a 20×30 mm bond area. Impact peel testing is performed on samples cured for various times and at various temperatures as indicated in Table 2. In some cases, impact peel testing is also performed on samples cured for 10 minutes at 160° C. Results are as indicated in Table 2.

Environmental aging under stress testing is performed as described above. Curing onset temperature is measured by differential scanning calorimetry.

TABLE 2

| Property | Comp. A | Comp. B | Comp. C | Comp. D | 1 | 2 |
|---|---|---|---|---|---|---|
| Lap Shear (MPa), 25 min cure @ 180° C. | 33.2 | 33 | 26.5 | 35.9 | 32.9 | 28.7 |
| Lap Shear (MPa), 10 min cure @ 160° C. | 23 | ND | ND | ND | 28 | 24.9 |
| RT Impact Peel (N/mm) | | | | | | |
| 25 minute cure @ 180° C. | 20.0 | 33 | 17 | 33.2 | 24.8 | 26.0 |
| 10 minute cure @ 171° C. | 19.7 | ND | ND | ND | 30 | 25.8 |
| 10 minute cure @ 160° C. | 11.1 | ND | ND | ND | 25.8 | 21.2 |
| Environmental Aging Under Stress (No. of Cycles to failure) | | | | | | |
| 25 minute cure @ 180° C. | 52 | 36 | 35 | 47 | 48 | 50 |
| 10 minute cure @ 160° C. | 49 | ND | ND | ND | 59 | 58 |
| Curing onset temp., ° C. | 167 | ND | ND | 167 | 158 | 154 |

TABLE 2-continued

| Property | Comp. A | Comp. B | Comp. C | Comp. D | 1 | 2 |
|---|---|---|---|---|---|---|
| 50° C. Storage modulus, MPa | 1110 | 830 | 830 | 920 | 930 | 1010 |
| Water uptake, % | 1.75 | 2.2 | 2.4 | 2.0 | 2.1 | 1.8 |
| Wet G' onset temp., ° C. | 64.9 | 55.2 | 50.5 | 50.5 | 63.5 | 58.1 |

ND—Not determined

In Tables 1 and 2, Comparative Sample A represents a baseline case. Without a catalyst as required herein, poor impact peel values are seen at the lower temperature cures, and especially at the 160° C. cure temperature. In addition, environmental aging under stress results at the 160° C. for Comparative Sample A are poorer than at the higher temperature cure. The poorer impact peel and stress aging results correlate to the higher curing onset temperature for this sample, which is 167° C. The sample does not cure well at the lower curing temperature.

Comparative Samples B and C show the effect of replacing the rubber-modified bisphenol F-based epoxy resin with a rubber modified bisphenol A-based epoxy resin. The environmental aging under stress results fall off dramatically with this change in rubber-modified epoxy resin, even when calcium oxide is present and, as in Comparative Sample C, the amount of rubber is increased.

Comparative Sample D demonstrates the effect of increasing the amount of rubber and toughener. This increases impact peel strength at the 180° C. cure but not significantly at the 160° C. cure. The curing onset temperature is 167° C. (equal to Comparative Sample A) and inadequate curing is achieved at the 160° C. cure temperature.

In Examples 1 and 2, the selection of catalyst, type of rubber-modified epoxy resin (bisphenol F type instead of bisphenol A type as in Comparative Samples B and C) and presence of calcium oxide leads to an adhesive which has excellent lap shear strength, excellent impact peel strength even at a 160° C. cure temperature, and also exhibits excellent performance on the environmental aging under stress test even when cured at only 160° C. Quite surprisingly, the environmental aging under stress values after curing at 160° C. are even higher than those obtained with the 180° C. cure.

The invention claimed is:

1. A heat-curable structural adhesive comprising:
A) 34.56 to 41 weight percent, based on the total weight of the heat-curable structural adhesive, of at least one diglycidyl ether of bisphenol A having an epoxy equivalent weight of about 186;
B) 23.8 to 26.5 weight percent, based on the total weight of the heat-curable structural adhesive, of a reaction product of 19.6% of a carboxyl-terminated copolymer of butadiene and acrylonitrile, the copolymer of butadiene and acrylonitrile having a number average molecular weight of 2000 to 6000 and 70.2% of a diglycidyl ether of bisphenol F having an epoxy equivalent weight of about 180 which reaction product is further diluted with 10.2% of a diglycidyl ether of bisphenol A having an epoxy equivalent weight of 1600 to 2000;
C) at least one elastomeric toughener containing isocyanate groups capped with phenol;
D) 4 to 5.1 weight percent, based on the total weight of the heat-curable structural adhesive, dicyandiamide;
E) 3 to 4 weight percent of calcium oxide, based on the total weight of the heat-curable structural adhesive;
F) a heat activatable catalyst comprising a mixture of 2,4,6-tris(dimethylaminomethyl)phenol and a novolac resin,
G) 0.1 to 0.2 weight percent, based on the total weight of the heat-curable structural adhesive, of a blocked diethylene triamine catalyst;
H) 0 to 14.8 weight percent, based on the total weight of the heat-curable structural adhesive, of a flame retardant;
I) 4 to 12.7 weight percent, based on the total weight of the heat-curable structural adhesive, of at least one inorganic filler;
J) a surfactant; and
K) a colorant
and further wherein the elastomeric toughener and the rubber portion of component B) together constitute from 16.8 to 17.2% of the total weight of the heat-curable adhesive, and the cured adhesive exhibits a storage modulus of at least 900 MPa at 50° C. as measured by dynamic mechanical analysis according to ASTM E2254-09 and withstands at least 45 cycles of the environmental aging under stress test after curing for 10 minutes at 160° C.

2. A method for bonding an aluminum member to a second metal member, comprising forming a layer of a heat-curable structural adhesive of claim 1 between and in contact with the aluminum member and the second metal member to form an assembly and then heating the assembly including the structural adhesive at a temperature of at least 120° C. up to 170° C. to cure the structural adhesive and form an adhesive bond between the aluminum member and the second metal member.

3. A heat-curable structural adhesive comprising:
A) 41 weight percent, based on the total weight of the heat-curable structural adhesive, of at least one diglycidyl ether of bisphenol A having an epoxy equivalent weight of about 186;
B) 23.8 weight percent, based on the total weight of the heat-curable structural adhesive, of a reaction product of 19.6% of a carboxyl-terminated copolymer of butadiene and acrylonitrile, the copolymer of butadiene and acrylonitrile having a number average molecular weight of 2000 to 6000 and 70.2% of a diglycidyl ether of bisphenol F having an epoxy equivalent weight of about 180 which reaction product is further diluted with 10.2% of a diglycidyl ether of bisphenol A having an epoxy equivalent weight of 1600 to 2000;
C) 12 weight percent, based on the total weight of the heat-curable structural adhesive, of at least one elastomeric toughener containing isocyanate groups capped with phenol;
D) 5.1 weight percent, based on the total weight of the heat-curable structural adhesive, of dicyandiamide;
E) 4 weight percent of calcium oxide, based on the total weight of the heat-curable structural adhesive;
F) 0.6 weight percent, based on the total weight of the heat-curable structural adhesive, of a heat activatable catalyst comprising a mixture of 2,4,6-tris(dimethylaminomethyl)phenol and a novolac resin,
G) 0.2 weight percent, based on the total weight of the heat-curable structural adhesive, of a blocked diethylene triamine catalyst;
H) 12.7 weight percent, based on the total weight of the heat-curable structural adhesive, of at least one inorganic filler;

I) a surfactant; and

J) a colorant and further wherein the elastomeric toughener and the rubber portion of component B) together constitute 16.8% of the total weight of the heat-curable adhesive, and the cured adhesive exhibits a storage modulus of at least 900 MPa at 50° C. as measured by dynamic mechanical analysis according to ASTM E2254-09 and withstands at least 45 cycles of the environmental aging under stress test after curing for 10 minutes at 160° C.

4. A method for bonding an aluminum member to a second metal member, comprising forming a layer of a heat-curable structural adhesive of claim 3 between and in contact with the aluminum member and the second metal member to form an assembly and then heating the assembly including the structural adhesive at a temperature of at least 120° C. up to 170° C. to cure the structural adhesive and form an adhesive bond between the aluminum member and the second metal member.

5. A heat-curable structural adhesive comprising:

A) 34.56 weight percent, based on the total weight of the heat-curable structural adhesive, of at least one diglycidyl ether of bisphenol A having an epoxy equivalent weight of about 186;

B) 26.5 weight percent, based on the total weight of the heat-curable structural adhesive, of a reaction product of 19.6% of a carboxyl-terminated copolymer of butadiene and acrylonitrile, the copolymer of butadiene and acrylonitrile having a number average molecular weight of 2000 to 6000 and 70.2% of a diglycidyl ether of bisphenol F having an epoxy equivalent weight of about 180 which reaction product is further diluted with 10.2% of a diglycidyl ether of bisphenol A having an epoxy equivalent weight of 1600 to 2000;

C) 12 weight percent, based on the total weight of the heat-curable structural adhesive, of at least one elastomeric toughener containing isocyanate groups capped with phenol;

D) 4 weight percent, based on the total weight of the heat-curable structural adhesive, of dicyandiamide;

E) 3 weight percent of calcium oxide, based on the total weight of the heat-curable structural adhesive;

F) 0.7 weight percent, based on the total weight of the heat-curable structural adhesive, of a heat activatable catalyst comprising a mixture of 2,4,6-tris(dimethylaminomethyl)phenol and a novolac resin, G) 0.1 weight percent, based on the total weight of the heat-curable structural adhesive, of a blocked diethylene triamine catalyst;

H) 14.8 weight percent, based on the total weight of the heat-curable structural adhesive, of a flame retardant;

I) 4 weight percent, based on the total weight of the heat-curable structural adhesive, of at least one inorganic filler;

J) a surfactant; and

K) a colorant and further wherein the elastomeric toughener and the rubber portion of component B) together constitute 17.2% of the total weight of the heat-curable adhesive, and the cured adhesive exhibits a storage modulus of at least 900 MPa at 50° C. as measured by dynamic mechanical analysis according to ASTM E2254-09 and withstands at least 45 cycles of the environmental aging under stress test after curing for 10 minutes at 160° C.

6. A method for bonding an aluminum member to a second metal member, comprising forming a layer of a heat-curable structural adhesive of claim 5 between and in contact with the aluminum member and the second metal member to form an assembly and then heating the assembly including the structural adhesive at a temperature of at least 120° C. up to 170° C. to cure the structural adhesive and form an adhesive bond between the aluminum member and the second metal member.

* * * * *